Nov. 24, 1959  B. C. BELL  2,914,701
HEADLIGHT BEAM INDICATOR
Filed Jan. 6, 1958
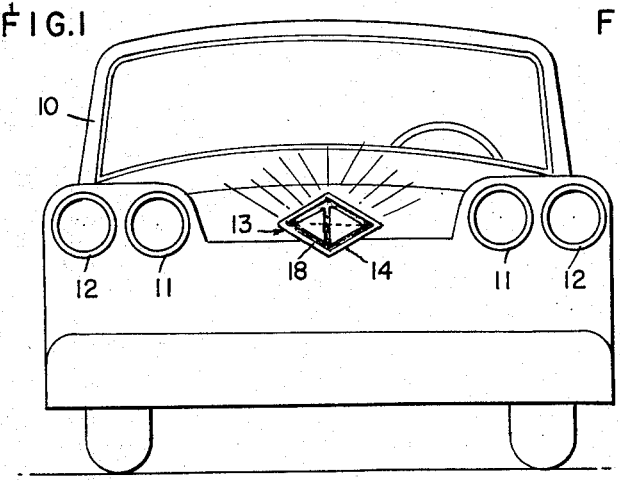
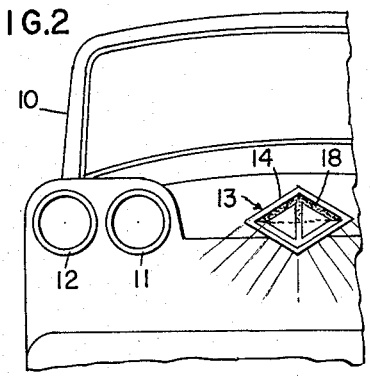
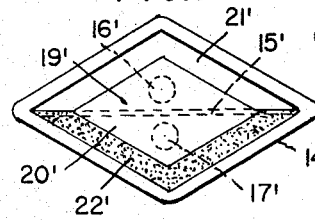
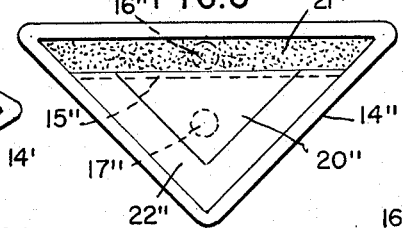
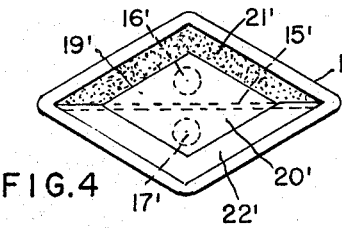
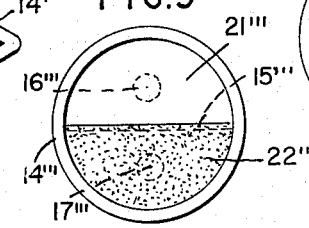
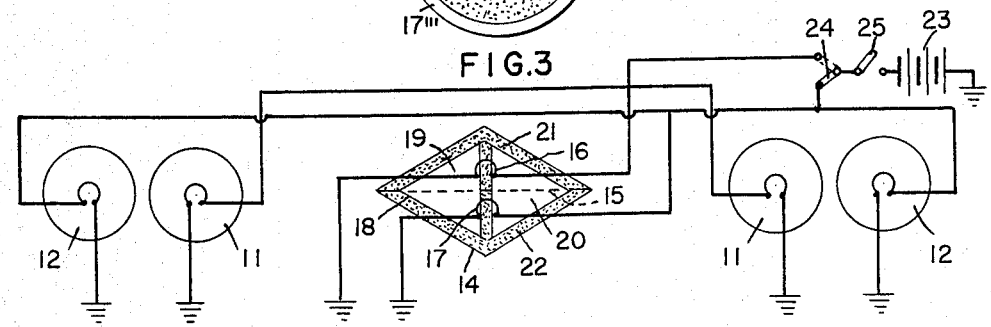
INVENTOR.
Bennett Carlyle Bell

United States Patent Office 2,914,701
Patented Nov. 24, 1959

2,914,701

HEADLIGHT BEAM INDICATOR

Bennett Carlyle Bell, Matewan, W. Va.

Application January 6, 1958, Serial No. 707,205

7 Claims. (Cl. 315—82)

This invention is a headlight beam indicator and more particularly is an indicator light mounted on the front of an automobile which notifies the driver of an approaching vehicle whether the high or low beam lights of the automobile are burning.

It is well known in the art to provide vehicles with a signal light for indicating to approaching drivers whether high or low beam lights are burning, illustrative of which is U.S. Patent No. 2,417,501. While the device of that patent represents a substantial advance in the art, the signal is operative only when one of the beams, preferably the lower, is lit. Consequently, unless that type of signal device were universally adopted, an approaching driver who saw no beam indicator signal light would not know whether the high beam lights were lit or whether the approaching car was not equipped with such an indicator. It is therefore the principal object of this invention to provide a headlight beam indicator which positively signals an approaching driver that either the high or low beam is lit.

Other objects are to provide an indicator light divided into two, isolated signal light compartments in circuit with the headlights, the two signal lights being selectively actuated by operation of the automobile's dimmer switch; and to provide signal lights of different geometric design which clearly denote which light beam is burning.

Still other objects will be manifest from the following descriptions of the present preferred forms of the invention, taken in connection with the accompanying drawings, wherein:

Fig. 1 is a front elevational view of an automobile equipped with a headlight beam indicator illustrating one of the signals emitted by the present invention;

Fig. 2 is a fragmentary view similar to Fig. 1, illustrating the alternative signal emitted by the present device;

Fig. 3 is a diagram of the electrical circuit connecting the device of the present invention to the electrical circuit of the automobile headlights;

Fig. 4 is a plan view of a modified form of the indicator of the present invention;

Fig. 5 is a plan view of the form of invention shown in Fig. 4, illustrating the alternative signal given by the indicator;

Fig. 6 is a plan view of another modified form of the present invention;

Fig. 7 is a plan view of the form of invention illustrated in Fig. 6 showing the alternative signal given by the indicator;

Fig. 8 is a plan view of still another form of the present invention; and

Fig. 9 is a plan view of the form of invention illustrated in Fig. 8 showing the alternative signal given by the indicator.

Referring now in greater detail to the drawings, there is illustrated in Figs. 1 and 2, an automobile including a chassis 10 equipped with pairs of high beam headlights 11 and low beam headlights 12. Mounted on the front of chassis 10, preferably intermediate each set of lights, is the headlight beam indicator of the present invention, generally designated 13.

Indicator 13 comprises a casing 14, which in the form of the invention illustrated in Figs. 1, 2 and 3 is of diamond shape. Casing 14 is separated by a horizontal partition 15 into upper and lower compartments, in which are light bulbs, designated 16 and 17 respectively. The front of indicator 13 is covered by a lens 18 which may be of one or two-piece construction, and of any desired color. Lens 18 is, in turn, partially masked as indicated at 19 and 20, leaving unmasked sections 21 and 22, from which light is selectively emitted. In the drawing, either section 21 or 22 is stippled to indicate a darkened area. It will be seen from Figs. 1 and 2 that sections 21 and 22 are designed in the shape of arrowheads, section 21 pointing upwardly to indicate that the upper beam is burning and section 22 pointing downwardly to indicate that the lower beam is burning.

As shown to advantage in Fig. 3, lights 16 and 17 are connected to the electrical circuits of headlights 11 and 12 respectively, these circuits being connected to a battery 23 through a dimmer switch 24 and a light switch 25. Current is supplied selectively to headlights 11 and signal light 16 or headlights 12 and signal light 17 by operation of dimmer switch 24 in a well known manner.

In use, when switch 25 is turned "on," either lights 11 or lights 12 are lit, depending upon the position of dimmer switch 24, the dimmer switch also selectively actuating signal lights 16 or 17. As shown to advantage in Figs. 1 and 2, headlight beam indicator 13 is situated intermediate and in substantially the same plane as the sets of headlights, this location heretofore having appeared as a darkened area at night to drivers in approaching vehicles. Thus with the device of the present invention, the driver of an approaching vehicle is advised, when at a remote distance from a vehicle equipped with the present headlight beam indicator, of two facts. First of all, the indicator notifies the approaching driver that the vehicle is equipped with a headlight beam indicator and secondly, is positively notified by appropriate illuminated signals, that either the high or low beam light is lit.

In Figs. 4 through 9, there are illustrated three modified forms of the present invention, these figures showing both the high and low beam signals. In the form of invention illustrated in Figs. 4 and 5, a casing of diamond shape is employed, the parts thereof corresponding to the component parts of the form of invention shown in Figs. 1 to 3, being identified by like primed numbers. It will be noted that the upper lighted section 21' of the indicator, when lit, forms an inverted or upwardly pointed illuminated V to indicate the high beams are "on" and section 22', when lit, emits an illuminated V to indicate that the lower beams are "on."

In Figs. 6 and 7, the indicator is of an inverted triangular design, the parts of which, corresponding to those shown in the form of invention illustrated in Figs. 1 to 3 being identified by similar double-primed numbers. In this form of invention, a horizontal bar of light 21" signifies the upper beam is lit and a glowing V 22" indicates the lower beam is lit.

Still another form of the present invention is illustrated in Figs. 8 and 9 wherein the indicator casing is of circular design and parts thereof, corresponding to members of that form illustrated in Figs. 1 to 3 are identified by like triple-primed numbers. In this form of the invention, the lens is not masked and the high and low beam signals comprise semi-circles of light 21''' and 22''', the flat sides of which are in facing relationship to one another.

In addition to its primary function set out above, the indicator of the present invention serves an additional purpose in the event that one of the headlights 11 or 12 is burned out. In this case, an approaching driver is readily advised upon seeing the one burning light and the indicator signal of the present invention, on which side of the vehicle the defective light is mounted. This invention further enables a driver to determine, by looking through his rear-view mirror, whether or not the automobile behind him is burning high or low beam lights.

While the device of the present invention has been shown and described as applied to automobiles having individual lamps for the high and low beam lights, it is to be understood that this invention is applicable to any other type of headlight designed to emit high and low beams. Also, various indicating signals other than those herein shown and described may be employed. Additional changes may be made within the scope of the claims hereto appended.

What I claim is:

1. A headlight beam indicator for a vehicle having high and low beam headlights, a source of electrical energy in circuit with said high and low beam headlights, switch means for selectively connecting said source of electrical energy to the high and low beam headlights, the beam indicator including signal means in circuit with said high beam headlights and signal means in circuit with said low beam headlights said beam indicator being mounted proximate the front end of the vehicle and directed at approaching vehicles.

2. A headlight beam indicator for a vehicle having high and low beam headlights, said beam indicator being mounted approximate the front end thereof and directed at approaching vehicles, the indicator including a casing partitioned to form separate signal compartments, and a source of illumination in each of said compartments in circuit with said high beam and said low beam of the vehicle headlights respectively, for emitting light signals therefrom.

3. A headlight beam indicator as set out in claim 2 wherein said signal compartments are adapted to emit light signals of different geometrical design to clearly indicate to an approaching driver which of the headlight beams is "on."

4. A headlight beam indicator as set out in claim 3 wherein said beam indicator includes a casing, the front of which is open, and a lens mounted in the open front of said casing coextensive with each of said signal compartments, said lens being masked to selectively emit an upwardly directed beam of light in the shape of an arrowhead from one signal compartment and a downwardly directed beam of light in the shape of an arrowhead from the other of said signal compartments.

5. A headlight beam indicator as set out in claim 3 wherein said beam indicator includes a casing, the front of which is open, and a lens mounted in the open front of said casing coextensive with each of said signal compartments, said lens being masked to selectively emit a beam of light in the shape of a V from one compartment and a beam of light in the shape of an inverted V from the other compartment.

6. A headlight beam indicator as set out in claim 3 wherein said beam indicator includes a casing, the front of which is open, and a lens mounted in the open front of said casing coextensive with each of said signal compartments, said lens being masked to selectively emit a beam of light in the shape of a horizontal bar from one compartment and a beam of light in the shape of a V from the other compartment.

7. A headlight beam indicator as set out in claim 3 wherein the light signals emitted from the signal compartments are of semi-circular design, the flat sides of the semi-circles of light being in facing relationship to one another.

References Cited in the file of this patent

UNITED STATES PATENTS

| | | |
|---|---|---|
| 2,417,501 | Johnston | Mar. 18, 1947 |
| 2,736,014 | Goedderz | Feb. 21, 1956 |